Nov. 21, 1961     N. D. LAMBERSON     3,009,714
TRAILER HITCH
Filed Feb. 25, 1960
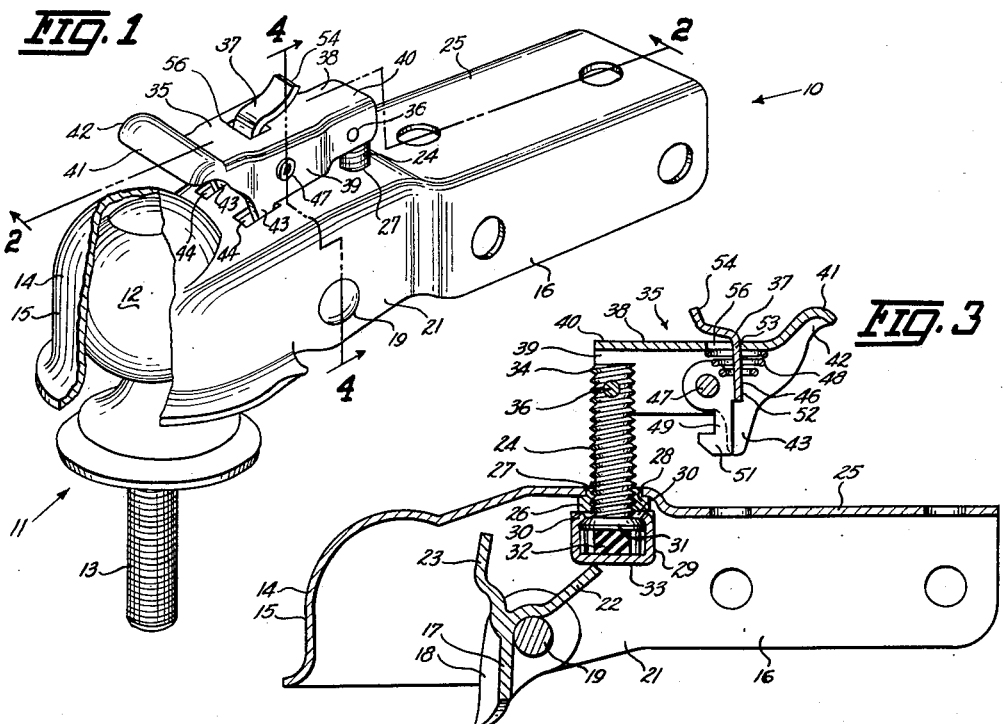
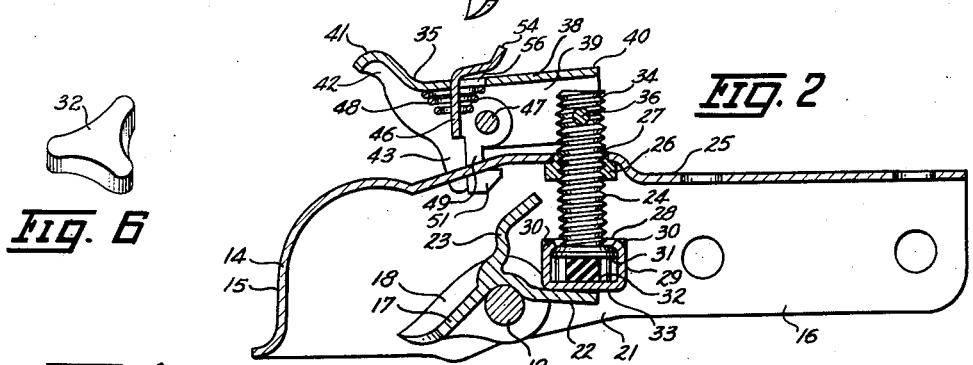
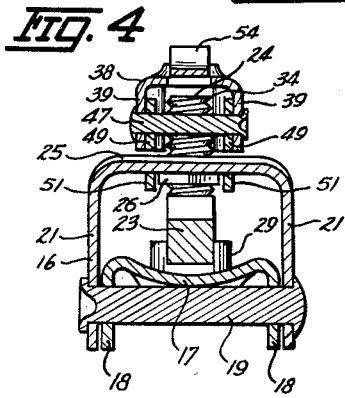
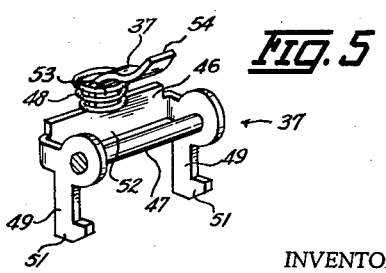
INVENTOR.
NATHANIEL D. LAMBERSON
BY
Lowell & Henderson
ATTORNEYS.

United States Patent Office 3,009,714
Patented Nov. 21, 1961

3,009,714
TRAILER HITCH
Nathaniel D. Lamberson, Oskaloosa, Iowa, assignor to Ideal Manufacturing Company, Oskaloosa, Iowa, a corporation of Iowa
Filed Feb. 25, 1960, Ser. No. 11,031
2 Claims. (Cl. 280—512)

This invention relates generally to trailer hitches and more particularly to a ball and socket type trailer hitch.

An object of this invention is to provide an improved ball and socket type trailer hitch.

Another object of this invention is to provide a trailer hitch of the above type wherein an operating handle is manually rotated to lock the ball in the socket provided therefor, and is then manually pivoted to releasably lock itself against rotation.

A further object of this invention is to provide a trailer hitch having a fixed jaw portion and a movable jaw portion for connecting the ball to the hitch, and wherein universal movement is obtained therebetween while providing a resilient connection with constant pressure on the ball.

Another object of this invention is the provision of a trailer hitch of the above type which is simple in construction, economical to manufacture, and efficient in operation in connecting a trailer to an automobile or the like.

Further objects, features and advantages of this invention will become readily apparent from a consideration of the following description when taken in conjunction with the accompanying drawing, wherein:

FIG. 1 is a perspective view of the ball and socket type hitch of this invention, with a portion broken away for the purpose of clarity and showing the hitch in a ball-locking position;

FIG. 2 is a longitudinal sectional view taken along the line 2—2 in FIG. 1;

FIG. 3 is a view similar to FIG. 2, and showing the hitch in an open or ball-unlocking position;

FIG. 4 is a cross sectional view taken along the line 4—4 in FIG. 1;

FIG. 5 is a fragmentary perspective view particularly of the operating handle and latch mechanism therefor; and FIG. 6 is a perspective detail view of a compressible washer which forms part of the hitch.

With reference to the drawings, the trailer hitch of this invention, indicated generally at 10 in FIG. 1, includes a ball unit 11 of well known construction having a ball-shaped upper end portion 12, and a depending bolt portion 13 for attachment to the frame or bumper of an automobile or other vehicle. The ball member 12 is adapted to be received within a partial socket-shaped portion 14 formed at what will hereinafter be referred to as the front end 15 of a shell member 16 which is of an inverted U-shape in transverse section (FIG. 4).

Arranged within the shell member 16 for rockable movement toward and away from the end portion 14 thereof is a jaw member 17 having a partial socket-shaped portion 18 adapted to engage one side of the ball 12. In the ball engaging position of the jaw member 17 (FIG. 2), the ball 12 is gripped between the movable jaw 17 and the shell portion 14 which functions as a fixed jaw.

The movable jaw 17 is rotatably supported on a shaft 19 secured at its opposite ends to the parallel leg portions 21 of the shell 16. The movable jaw 17 is further provided with a straight projection 22 and a curved projection 23. The projections 22 and 23 and socket portion 18 are extended substantially radially of the shaft 19 (FIG. 2) and are angularly spaced from each other.

Arranged for coaction with the straight projection 22 of the movable jaw 17 is an elongated threaded member 24 threadably inserted through a nut 26 (FIG. 2) which is secured to the underside of the top wall 25 of the shell member 16. The nut 26 is axially aligned with an opening 27 formed in the top wall 25. The lower end of the threaded member 24 is inserted through an opening 28 formed in a cap 29. A head 31 formed on the lower end of the member 24 is positioned within the cap 29 which is crimped or bent at 30 whereby the cap is loosely held onto the member 24. A resilient, compressible washer 32 (FIG. 6), of rubber or the like, is retained within the cap 29 and placed between the head 31 and the base 33 of the cap 29.

At the upper end 34 of the threaded member 24, which is disposed outwardly of the shell member 16, there is pivotally connected, as by a pivot pin 36, a handle unit 35. A latch device 37 (FIG. 1) is pivotally connected to the handle unit 35, at the end thereof remote from the pivot 36, for releasably securing the handle unit 35 to the shell member 16. The handle unit 35 includes an inverted U-shaped body member 38 having a pair of depending parallel leg portions 39 (FIG. 4). At the forward end 41 (FIG. 2) of the member 38, a curved thumb or finger receiving member 42 is provided, and intermediate the forward end 41 and the rear end 40 of the member 38 are a pair of depending legs 43 for insertion through elongated slots 44 (FIG. 1) formed in the top wall 25 of the shell member 16.

The latch device 37 comprises a one piece actuating member 46 (FIG. 5) which is pivotally connected to the handle member 38 by a pivot pin 47. The member 46 includes a pair of transversely spaced depending legs 49 each of which is provided with a hooked locking finger 51 (FIG. 2). The legs 49 are joined by a transversely extended strap 52 (FIG. 5) having a neck portion 53 intermediate the ends thereof and extended upwardly and terminating in an actuating projection 54. The projection 54 extends through a slot 56 provided therefor in the upper wall of the handle member 38. A spring 48 (FIGS. 2 and 5) is positioned about the neck portion 53 and extends between the strap 52 and the handle member 38. In this position, the spring 48 biases the locking fingers 51 toward their locking positions illustrated in FIG. 2.

In use, assume the movable jaw 17 is in its ball releasing position best shown in FIG. 3. In this position, the jaw 17 is hanging downwardly in a suspended position relative to the pivot pin 19. The threaded member 24 is fully extended outwardly of the shell member 16 such that the handle 38 is free for rotatable movement in a horizontal plane about the normally vertical member 24. It is also noted that the straight projection 22 abuts against the cap 29 and prevents further counter-clockwise movement of the jaw member 17 (FIG. 3).

To lock the ball 12 between the fixed and movable jaws 14 and 17, respectively, the handle member 38 is manually rotated in a direction to thread the member 24 downwardly. In so doing, the base 33 of the cap 29 moves downwardly against the straight projection 22. Continued rotation of the handle 38 thereby moves the movable jaw 17 in a clockwise direction (FIGS. 2 and 3) until the jaw portion 18 and fixed jaw portion 14 are seated with the ball 12. The handle 38 is then additionally rotated to compress the washer 32 until the handle is in a position (FIGS. 1 and 2) to locate the handle member legs 43 in alignment with the shell member slots 44. Compression of the flat-surfaced washer 32 occurs by virtue of its having an equilateral triangular shape in plan view, with the sides thereof slightly concave and whereby space for lateral bulging during compression is provided.

Grasping the end 41 between the thumb and finger, the handle member 38 is then forced downwardly with sufficient pressure to move the legs 49 and 43 through the slots 44. During this operation, the lower surfaces of the locking fingers 51 strike the surface of the top wall 25, causing the fingers 51 to pivot clockwise (FIG. 2) against the bias of the spring 48 until they come into transverse alignment with the handle member legs 43. Then, after being forced through the slots 44, the legs 49 are snapped back into their original position, thus engaging the locking finger 51 (FIG. 2) with the underside of the shell member top wall 25. The handle unit 35 is thereby releasably locked to the shell member 16 and rotation of the member 24 in either direction is prevented.

By this operation, the ball 12 is locked in place between the movable jaw 17 and fixed jaw 14 and for universal movement relative to the shell member 16. The compression of the washer 32 assures the application of a constant pressure upon the ball 12 by the jaw 17 to prevent rattling of the jaw 17. Additionally, the resiliency of the washer 32 provides a resilient connection between the ball 12 and the hitch 10 of a shock absorbing type, compensates for the ball 12 being out-of-round, and assures a zero allowance fit of the ball 12.

To release the ball 12 from the shell member 16, the actuating projection 54 of the member 46 is pressed downwardly and rearwardly toward the handle member 38, concurrently with a thumb manipulation of the handle member 38 to swing the handle 38 upwardly and outwardly of the shell member 16 from the position shown in FIG. 2. This movement relocates the handle unit 35 to a position above the shell member 16, whereby the handle unit 35 can be rotated to thread the member 24 upwardly and outwardly of the shell member. Continued upward movement of the member 24 permits the jaw portion 17 to pivot in a counter-clockwise direction about the pin 19 into the ball releasing position of FIG. 3. This operation provides for a ready withdrawal of the ball 12 from the shell member 16.

It is to be noted that the location of the curved projection 23 (FIG. 2) is such that should the jaw member 17 be swung into a clockwise direction, the projection 23 will contact the member 24 thus preventing further rotation in that direction of the jaw 17. This prevents the jaw 17 from swinging too far underneath the shell member 16, ensuring that the jaw portion 18 is always under the ball 12. As a result, should the jaw 17 be stuck for some unusual reason in the position of FIG. 2, upon insertion of the ball 12 into the fixed jaw 14, the jaw 17 will be pushed upwardly or clockwise until the projection 23 strikes the member 24. As the ball 12 cannot there be properly seated, the operator will separate the ball and the hitch, manually locate the jaw 17 in the FIG. 3 position, and then seat the ball for proper locking.

From the above description, it is seen that this invention provides a trailer hitch 10 of the ball and socket type, which is readily operable to clamp the ball 12 within a shell 16. By virtue of the articulated arrangement of the handle unit 35 and the latch device 37, wherein they are combined as a single unit movably mounted by the threaded member 24 on the shell 16, the combined handle and latch unit is readily movable about respective vertical and horizontal axes for effecting a quick and positive coupling between the ball and the shell.

Although the invention has been described herein with respect to a preferred embodiment, it is to be understood that it is not to be so limited since various alterations and modifications can be made thereto without departing from the scope of the invention, as defined in the appended claims.

I claim:

1. A ball and socket type trailer hitch comprising a shell member having a fixed jaw portion of a shape to receive a ball therein, means rockably mounted on said shell member and movable into and out of a ball engaging position wherein the ball is seated in said fixed jaw portion, resilient means mounted within said shell member and engageable with said rockably mounted means, an elongated element threadably connected to said shell member for reciprocal movement, one end of said element being operatively engageable with said resilient means and adapted upon rotation to move said resilient means against said rockably mounted means for movement thereof into said ball engaging position, the other end of said element projected outwardly of said shell member, means for releasably locking said element against movement including a handle one end of which is pivotally connected to the projected end of said element, and including further latch means pivotally connected to said handle and releasably lockable to said shell member when said rockably mounted means is in said ball engaging position.

2. A ball and socket type trailer hitch comprising a shell member having a fixed jaw portion of a shape to receive a ball therein and having further a slot formed therein, means rockably mounted on said shell member and movable into and out of a ball engaging position, an elongated element threadably mounted on said shell member for reciprocal movement relative thereto, one end of said element disposed within said shell member and the other end thereof projected outside said shell member, a cap loosely engaged with said one end and engageable with said rockably mounted means, a flat resilient washer housed within said cap and compressibly engageable by said one end, whereby threaded rotation of said element is adapted to compressibly force said washer and said cap against said rockably mounted means to move same into said ball engaging position, and combination latch and handle means the handle of which is pivotally connected to said projected end for movement in a vertical plane, and the latch of said combination including an extended finger releasably lockable with said shell member by inserting said finger through said slot when said rockably mounted means is in a ball engaging position.

References Cited in the file of this patent

UNITED STATES PATENTS

| 2,270,569 | Weiss | Jan. 20, 1942 |
| 2,854,256 | Lamberson | Sept. 30, 1958 |

FOREIGN PATENTS

| 822,585 | France | June 8, 1943 |